United States Patent [19]
Walsh et al.

[11] 3,713,810
[45] Jan. 30, 1973

[54] BENEFICIATION OF BERYLLIUM

[75] Inventors: Kenneth A. Walsh, Fremont; Andrew J. Sandor, Perrysburg, both of Ohio

[73] Assignee: The Brush Beryllium Company, Cleveland, Ohio

[22] Filed: May 11, 1970

[21] Appl. No.: 36,448

[52] U.S. Cl. ................75/101 R, 75/121, 75/84, 148/11.5 R, 148/13
[51] Int. Cl. .............................................C22b 35/00
[58] Field of Search............75/101, 121, 84; 148/13, 11.5 R, 148/11.5 F

[56] References Cited

UNITED STATES PATENTS

| | | | |
|---|---|---|---|
| 2,170,394 | 8/1939 | Von Zeppelin | 75/121 |
| 2,872,363 | 2/1959 | Macherey | 148/11.5 R |
| 3,065,117 | 11/1962 | Brown et al | 148/13 R |

*Primary Examiner*—L. Dewayne Rutledge
*Assistant Examiner*—G. T. Ozaki
*Attorney*—McNenny, Farrington, Pearne and Gordon

[57] ABSTRACT

There is provided an improved process for beneficiating beryllium metal and more particularly a process for purifying beryllium particles, particularly cast or virgin beryllium particles, by leaching with aqueous acid at relatively low temperatures for up to 6 or 8 hours, and characterized by the step of submitting the beryllium, either before or after conversion to particulate metal, to a thermal aging treatment at elevated temperatures for a prolonged period of time.

8 Claims, No Drawings

BENEFICIATION OF BERYLLIUM

BACKGROUND OF INVENTION AND PRIOR ART

This invention relates, as indicated, to an improved process for treating beryllium and more particularly to treating beryllium to aid in removing impurities from particles of beryllium metal. It is desirable to reduce in beryllium metal the concentration of certain impurities such as carbon, silicon, chromium, manganese, magnesium, titanium, and particularly iron and aluminum. It has been found that this can be accomplished to a desirable extent by leaching particles of beryllium metal ranging in size from sub-sieve sizes, e.g. −20 microns, to one-eighth inch or larger with a strong acid solution. The process is conveniently carried out at room temperature for 4 to 6 hours followed by washing and recovery of the metal. Concentrated acid is desirably supplied to the leaching bath as it is consumed to maintain the pH below a predetermined level, e.g. 3.5.

It has now been found that with cast or virgin beryllium, improved results are secured if the beryllium is subjected to thermal aging prior to the leaching step. While both recycle or hot pressed beryllium and cast or virgin beryllium particles are beneficiated by the acid leaching process, the ease of iron removal with the cast or virgin beryllium is considerably less than with the recycle beryllium. However, if the virgin beryllium is first subjected to thermal aging in either the cast or particulate form as hereinafter described, the extent of iron removal is materially enhanced.

Beryllium metal has been previously submitted to heat treatment to improve its ductility (U. S. Pat. No. 3,065,117 dated Nov. 20, 1962). However, the applicability of heat treatment to a leaching process for purification of virgin or cast beryllium is not there suggested.

BRIEF STATEMENT OF INVENTION

Briefly stated, the present invention is in a method for beneficiating particulate cast or virgin beryllium which includes the step of thermally aging the beryllium at a temperature of at least about 960° F. for a period of time to convert iron impurities in the beryllium to a leachable form. Thereafter, to purify the beryllium metal, a slurry of particles of the thermally aged beryllium in a solution of acid is formed, the concentration of beryllium being generally between 70 and 800 grams per liter of acid solution. The most satisfactory acids or hydrolyzable salts are sulfamic, oxalic, phosphoric, nitric, sulfuric, or mixtures of two or more acids in aqueous solution. The slurry is agitated and the temperature generally held to a temperature below the boiling point of the acid solution. Room temperature is quite satisfactory. The pH is maintained between 0.0 and 3.5 for best results. The time of exposure to the acid depends on many factors. However, minimizing the loss of beryllium metal while extracting the optimum amount of iron and aluminum indicates a time of from 2 to 8 hours, and usually 4 to 6 hours at room temperature. Higher temperatures increase the rate of leaching of impurities and also the rate of loss of beryllium metal. After leaching, the metal is separated from the leaching bath, washed and recovered.

DETAILED DESCRIPTION

The particle size of beryllium which may be treated in accordance herewith to remove impurities include beryllium scrap such as saw sludges, mill chips, skinning product, machine turnings, etc., as well as finely divided beryllium. The particles may range in size up to as large as 0.1 inch on one dimension. Mill chips for example run as large as ⅜ inch × ⅜ inch × 100 mils. Saw sludge contains particles averaging about −10 mesh. The phrase "finely divided beryllium" as used herein means beryllium powder having a particle size ranging from sub-sieve micron size to −100 mesh. Finely divided beryllium in this process shows the greatest extent of impurity depletion and yields a product especially useful for high purity powder applications. A preferred range is −15 microns to −200 mesh.

As indicated above, instead of the acid, any soluble salt of the foregoing acids which hydrolyzes to provide the desired acidity may be used in place of part or all of the acid. For example, aluminum nitrate, beryllium nitrate, and beryllium sulfate are particularly effective in purifying beryllium.

The temperature at which leaching is done may cover a wide range extending from room temperature to below the boiling temperature of the acidic leaching solution and is, therefore, not critical other than to avoid loss of acid by decomposition. While the slurry of beryllium particles and acid is initially conveniently made at room temperature, some temperature rise due to the exothermic nature of the reaction may cause considerable temperature rise, and for practical purposes, the temperature of the leaching bath should be kept below the boiling point. External cooling is conveniently used in commercial practice.

The slurry should be agitated for a sufficient time to remove the impurities from the beryllium to the desired extent as preliminary tests, for example, show to be required. Although it is not critical, the leaching time is generally from 2 to 6 hours. However, the leaching time may vary widely depending on the particle size and the extent of impurity depletion sought.

The concentration of particulate beryllium in the slurry is generally between 70 and 800 grams per liter of leaching bath, and preferably from 200 to 650 grams per liter of leaching bath. When using 1.0 N to 1.5N nitric acid solution, an optimum concentration is from 350 grams to 650 grams per liter of leaching bath. With sulfamic acid, the concentration is desirably no more than about 200 grams per liter of one normal sulfamic acid solution.

The pH of the leaching bath should be maintained between 0.0 and 3.5. In practice, pH monitoring by means of a narrow range paper indicator and comparison with a color chart is used. When the pH of the leaching bath reaches a predetermined level, e.g. 2, the operator adds concentrated acid and restores the low pH level.

After completion of the purification process, the particulate beryllium is separated from the leaching bath by any conventional manner, e.g. filtration. The separated particulate beryllium is then washed and dried by known procedures.

THERMAL AGING PROCEDURES

The characterizing feature of the present invention is the submission of cast or virgin beryllium, either before or after reduction to particulate form, to a thermal aging history. When cast beryllium is submitted to the basic acid leaching process as above described, but without the thermal aging procedure, the extent to which the impurity, iron, can be removed is frequently insufficient for purposes requiring high purity beryllium. However, when the cast beryllium is first thermally aged either in the massive cast form or subsequently when reduced to particulate form as by working, ball milling, machining or the like, the extent of removal of iron is surprisingly greatly enhanced, and high purity beryllium can be produced having iron content reduced to within tolerable limits. Leaching of particulate cast beryllium without the thermal aging yields substantially the same extent of impurity depletion for all impurities except iron. Hence the thermal aging aspect of the present invention effects a conditioning of the beryllium whereby iron contained therein is converted to a leachable condition. The mechanism by which this is achieved is not known. While we do not wish to be bound by any theory of how iron is rendered leachable in virgin or cast beryllium, we believe that the observed phenomenon may be explained in the following manner:

Because of the cooling rates employed in the casting of beryllium, a major portion of the iron impurity which is completely dissolved in the molten metal is quenched in the solid solution state. Maximum production rates are achieved in this manner, but minimum conversion to leachable iron is obtained. In order to convert the iron found in cast beryllium into a leachable state, it is necessary, we believe, to bring about either or both of the following reactions:

$$\text{Al} + \text{Fe (solid solution)} + 4\text{Be (excess)} \rightleftharpoons \overline{\text{AlFeBe}_4} \quad \text{(I)}$$

$$\text{Fe (solid solution)} + 11\text{Be (excess)} \rightleftharpoons \text{FeBe}_{11} \quad \text{(II)}$$

The reaction products, $\text{AlFeBe}_4$ and $\text{FeBe}_{11}$, are soluble in the acidic leaching solution. Reactions (I) and (II) are reversible and temperature sensitive. The rate of formation of $\text{AlFeBe}_4$ is fairly rapid initially at temperatures above 1,350° F., so that about 90% of the maximum attainable $\text{AlFeBe}_4$ is formed in one hour or less. The maximum attainable $\text{AlFeBe}_4$ is not reached until the metal has been thermally aged for 60 – 100 hours at 1,350° F.; for at least 24 hours at 1,425° F.; and for 16 hours at 1,570° F.

The maximum attainable leachable iron, however, increases as the temperature is decreased. Reactions (I) and (II) yield more of the $\text{AlFeBe}_4$ and $\text{FeBe}_{11}$ at lower temperatures. However, both reactions (I) and (II) are quite slow at low temperatures. At 960° F., for example, the rate of formation of leachable iron is about 1 part per million per hour. After 480 hours at 960° F., the highest leachable iron (percentage-wise) has been determined experimentally, yet the theoretical maximum of $\text{AlFeBe}_4$ and $\text{FeBe}_{11}$ from equilibrium constants is more than 100 ppm of iron greater than actually achieved.

In general, it has been found that thermal aging of virgin beryllium yields a more readily purifiable and hence recoverable material. Thermal aging contemplates elevating the temperature of cast beryllium metal to a predetermined temperature above about 960° F. to as high as 2,100° F., and more specifically, between 1,000° F. and 1,900° F. The rate of temperature elevation to the predetermined temperature may be any which is convenient, e.g. as much as 500° F. to 1,000° F per hour or more. When the predetermined temperature is reached, the beryllium metal is "soaked" or held at this temperature for a prolonged period of time. The holding period is at least 10 hours and, as indicated above, may be as long as several hundred hours, e.g., 500 hours. Thereafter, the beryllium metal is cooled to room temperature. The rate of cooling is desirably controlled, and it has been found that for best results the rate of cooling should be between 5° F. and 25° F. per hour especially when soaking at temperatures above 1,500° F. until a temperature of about 400° F. has been reached. Cooling rates are less influential when soaking at temperatures below 1,350° F. except to give a slight incremental increase in the leachable iron. When the beryllium has cooled to below 400° F., cooling to room temperature may be at any desired or convenient rate including quenching in cold water.

A preferred technique used to approach a maximum practical leachable iron content is to heat the virgin beryllium, preferably as chips, to 1,500° F. for 12 hours, then slow cool at a rate not in excess of 10° F. reduction in temperature per hour to about 400° F. and thereafter any convenient cooling rate, e.g., spontaneous cooling, to room temperature. After thermal aging, the chips are desirably although not essentially comminuted to −325 mesh powder before leaching. In one embodiment of the preferred technique, input virgin beryllium chips had 1,200 ppm. of Fe and 680 ppm. Al. Two product lots after leaching with 1.0 N nitric acid contained 810 and 850 ppm. Fe, and 292 and 273 ppm. Al, respectively.

The leaching data obtained in the following Table was obtained on comminuted virgin or cast beryllium powder after thermally aging in the powder form. Powder No. 1 in the table was −325 mesh, and powder No. 2 was −200 mesh. The virgin chips Nos. 1 and 2 were thermally aged in chip form, comminuted to −325 mesh and then leached. The recycle powder in the table was −200 mesh produced from chips machined from hot pressed beryllium block treated according to U. S. Pat. No. 3,065,117 to improve ductility. The leaching acid solution was sulfamic or nitric acid, 1 normal aqueous solution, as specified. The temperature at the outset was room temperature and the concentration of virgin beryllium in the slurry was 100 – 200 grams per liter. The temperature was allowed to rise spontaneously during leaching. The time of leaching was 4 hours.

TABLE
ACID LEACHING OF THERMALLY AGED BERYLLIUM

| samp. no. | Condition | Thermal Aging History Max. temp. | soak time | Acid | Input ppm Fe | ppm Al | Product ppm Fe | ppm Al |
|---|---|---|---|---|---|---|---|---|
| | | °F. | hrs. | | | | | |
| 1 | Powder 0 | 1 | — | none | sulfamic | 1082 | 445 | 1074 | 70 |

| # | Material | | | Temp | Time | Acid | | | | |
|---|---|---|---|---|---|---|---|---|---|---|
| 1a | Powder | 0 | 1 | — | none | nitric | 1082 | 445 | 1067 | 100 |
| 2 | Powder | 0 | 1 | 1080 | 120 | sulfamic | 1101 | 430 | 962 | 230 |
| 2a | Powder | 0 | 1 | 1080 | 120 | nitric | 1101 | 430 | 1009 | 250 |
| 3 | Powder | 0 | 1 | 1260 | 72 | sulfamic | 1138 | 500 | 858 | 160 |
| 3a | Powder | 0 | 1 | 1260 | 72 | nitric | 1138 | 500 | 897 | 170 |
| 4 | Powder | 0 | 1 | 1570 | 65 | sulfamic | 1028 | 430 | 757 | 90 |
| 5 | Powder | 0 | 1 | 1750 | 24 | sulfamic | 1144 | 320 | 1011 | 100 |
| 5a | Powder | 0 | 1 | 1750 | 24 | nitric | 1144 | 320 | 1039 | 85 |
| 6 | Powder | 0 | 2 | — | none | sulfamic | 950 | 650 | 952 | 280 |
| 7 | Powder | 0 | 2 | 1325 | 72 | sulfamic | 935 | 600 | 658 | 350 |
| 8 | Powder | 0 | 2 | 1565 | 24 | sulfamic | 1070 | 600 | 697 | 250 |
| 9 | Powder | 0 | 2 | 1427 | 24 | sulfamic | 1070 | 650 | 644 | 280 |
| 10 | Chips | 0 | 1 | 1830 | 39 | sulfamic | 1303 | 446 | 1135 | — |
| 11 | Chips | 0 | 1 | 1570 | 66 | sulfamic | 1210 | 680 | 784 | 340 |
| 12 | Chips | 0 | 1 | 1557 | 16 | sulfamic | 1310 | 760 | 809 | 280 |
| 13 | Chips | 0 | 2 | 1439 | 16 | sulfamic | 440 | 300 | 343 | 115 |
| 14 | recycle powder | | | — | none | sulfamic | 1308 | 550 | 687 | 85 |
| 14a | recycle powder | | | — | none | nitric | 1308 | 550 | 771 | 120 |
| 15 | recycle powder | | | 1415 | 24 | sulfamic | 1270 | 500 | 840 | 200 |
| 15a | recycle powder | | | 1415 | 24 | nitric | 1270 | 500 | 847 | 120 |
| 16 | recycle powder | | | 1581 | 111 | sulfamic | 1253 | 450 | 957 | 190 |

The aqueous acid solutions were used at 1 N concentration. Cooling from the aging temperature was very rapid to freeze the conditions and demonstrate the increase in leachable iron with lower temperatures and ranged from 8 to 13 minutes to 900° F. and less than 1 hour from 900° F. to room temperature. Oxalic acid, 1 N, phosphoric acid, 3 N, and sulfuric acid, 1 N may be used in place of the nitric and sulfamic acids.

The foregoing table also compares recycle beryllium powder with virgin beryllium powder and clearly demonstrates that with recycle beryllium the thermal aging technique offers little or no improvement over the material not submitted to the thermal history hereof. With the virgin beryllium, the thermal aging technique materially affects the leachability of iron, but does not significantly affect the leachability of aluminum. The leachability of other impurities in virgin beryllium appears to be neither enhanced nor adversely affected by the thermal aging process.

What is claimed is:

1. A method of purifying particulate cast or virgin beryllium which comprises the steps of:
   a. thermally aging the beryllium at a temperature of at least 960° F. for a period of time sufficient to convert iron impurity in the beryllium to a leachable form;
   b. comminuting the beryllium to particle sizes in the range of −20 microns to 0.1 inch;
   c. forming a slurry of particles of the thermally aged beryllium with an aqueous solution of at least one acid selected from sulfamic, oxalic, phosphoric, nitric, and sulfuric acids, the concentration of beryllium particles in said slurry being between 70 and 800 grams per liter of acid solution;
   d. agitating said slurry at a temperature below the boiling point of the acid solution while:
   e. maintaining the pH between 0.0 and 3.5 until iron is dissolved in the acid solution, and
   f. separating iron-depleted beryllium from the solution.

2. A method in accordance with claim 1 wherein the comminution step occurs before the step of thermal aging.

3. A method in accordance with claim 1 wherein the comminution step occurs after the step of thermal aging.

4. A method in accordance with claim 1 wherein the step of thermal aging includes the step of heat soaking the beryllium at a predetermined temperature above approximately 960° F.

5. A method in accordance with claim 1 wherein the step of thermal aging includes the step of cooling at a predetermined rate of temperature reduction until a temperature of about 400° F. is reached.

6. A method in accordance with claim 1 wherein the step of thermal aging includes the steps of heating the beryllium to approximately 1,500° F., maintaining a temperature of about 1,500° F. for 12 hours, and cooling at a rate not to exceed about 10° F. per hour to at least 400° F. and thereafter cooling at any desired rate to leaching temperature or below.

7. A method in accordance with claim 1 wherein the step of thermal aging includes the steps of heating at a rate in excess of 500° F. per hour to a predetermined elevated temperature between 960° F. and 2,100° F., holding at said predetermined elevated temperature for from 10 to 500 hours, and cooling at a predetermined rate not to exceed 25° F. per hour to a temperature below about 400° F.

8. In a process for leaching impurities from particulate cast or virgin beryllium with aqueous acid solution at a pH of from 0.0 to 3.5 and with agitation, the improvement which comprises thermally aging the beryllium at a temperature of at least 960° F. for a period of time sufficient to convert iron impurity in the beryllium to a leachable form.

* * * * *